(12) United States Patent
Koegler, III et al.

(10) Patent No.: US 7,276,852 B2
(45) Date of Patent: Oct. 2, 2007

(54) LAMP HEADER WITH START-UP CONDUCTOR FOR AN ULTRA HIGH PRESSURE BULB

(75) Inventors: John M. Koegler, III, Corvallis, OR (US); Luis Aldarondo, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 197 days.

(21) Appl. No.: 10/769,324

(22) Filed: Aug. 9, 2004

(65) Prior Publication Data

US 2006/0028141 A1    Feb. 9, 2006

(51) Int. Cl.
*H01J 17/18* (2006.01)
*H01J 61/36* (2006.01)
*H01J 61/54* (2006.01)

(52) U.S. Cl. .................... 313/623; 313/624; 313/625; 313/594

(58) Field of Classification Search ............... 313/594, 313/607, 234, 623–625
See application file for complete search history.

(56) References Cited

U.S. PATENT DOCUMENTS

| 5,323,091 | A | * | 6/1994 | Morris ..................... 315/344 |
| 5,789,850 | A | * | 8/1998 | Iwafuji et al. ......... 313/318.08 |
| 6,294,870 | B1 | * | 9/2001 | Kawashima et al. ........ 313/623 |
| 2005/0140295 | A1 | * | 6/2005 | Van Den Nieuwenhuizen ........... 313/567 |

FOREIGN PATENT DOCUMENTS

JP     2002025328 A  *  1/2002
WO  WO 2003044826 A2  *  5/2003

* cited by examiner

*Primary Examiner*—Sikha Roy
*Assistant Examiner*—Natalie K. Walford

(57) ABSTRACT

A lamp—suitable for use within a projector or other high-light output application—includes an ultra high pressure bulb. An extension from the bulb defines a start-up bubble. A conductor is carried by the extension of the ultra high pressure bulb, generally enclosing the start-up bubble, thereby exciting gas contained within the start-up bubble. A header defines a socket within which the extension and the conductor are carried.

21 Claims, 5 Drawing Sheets

LAMP HEADER WITH START-UP CONDUCTOR FOR AN ULTRA HIGH PRESSURE BULB

RELATED APPLICATIONS

This patent application is related to U.S. patent application Ser. No. 10/769,325, titled "Replacement Lamp Assembly Having a Cap", filed on Jan. 30, 2004, commonly assigned herewith, and hereby incorporated by reference.

This patent application is related to U.S. patent application Ser. No. 10/769,613, titled "A Replacement Lamp Header For Positioning a Lamp Within a Reflector Assembly", filed on Jan. 30, 2004, commonly assigned herewith, and hereby incorporated by reference.

This patent application is related to U.S. patent application Ser. No. 10/769,322, titled "Datum Structure for Ensuring Alignment of a Lamp Assembly", filed on Jan. 30, 2004, commonly assigned herewith, and hereby incorporated by reference.

BACKGROUND

Ultra-high pressure lamp innovations have produced one of the brightest lighting technologies known. Such bulbs are frequently used in projectors and other applications. A quartz bulb typically includes a spherical middle portion from which opposed first and second cylindrical portions extend in a co-axial manner. The spherical middle portion defines an interior chamber which contains mercury and/or halogen vapor or gas. Two electrodes within the chamber are typically made of tungsten or other high-melting point metal. First and second conductors extend from the electrodes through the opposed first and second cylindrical portions. In a typical application, the conductors are made of molybdenum, which is a conducing material that will bond to the quartz used to make the bulb. Such bonding is necessary to prevent leakage of the mercury and/or halogen vapor, particularly at high operating temperatures and pressures.

A failure mode for such bulbs involves degradation of the electrodes due to high start-up voltages. Accordingly, structures have been developed to reduce the start-up voltage required. In one design that reduces the required start-up voltage, one of the cylindrical portions may define a small bubble—within the quartz rod making up the cylindrical portion—which may be filled with mercury and/or halogen vapor. A coil surrounding the quartz rod and bubble is located on one side of the spherical middle portion, while the center of the reflector is located on the other side of the middle portion. The coil is typically held to ground or negative voltage while high voltage is applied to the electrodes. The coil acts in a manner similar to one plate of a capacitor, and tends to assist in the stimulation of the vapor in the bubble, thereby causing UV light to pass into the chamber. The UV light tends to reduce the start-up voltage required to create plasma from the mercury vapor. Upon creation of the plasma, the start-up voltage is stepped down to an operating voltage, and the pressure within the chamber defined within the spherical portion increases to approximately 200 atmospheres.

FIG. 9, Prior Art, shows a cross-sectional view of an exemplary Prior Art lamp 900. A high-pressure bulb 902 is centrally located within a reflector 904. The bulb 902 includes a rearward cylindrical extension 906, which is attached to the reflector 904, typically by adhesive. A forward cylindrical extension 908 is wrapped with a coil 912, which aids in starting the bulb 902. A fireball portion 910 of the bulb 902 is located at approximately a focal point of the reflector 904. A wire 916 provides power to one of the electrodes within the bulb 902. Unfortunately, the coil 912 is sometimes damaged due to its exposed position on the cylindrical portion 908 of the bulb 902. An additional problem is seen in that the coil 912 and wire 914 leading to the coil 912 tend to block light emitted from the spherical portion 910 of the bulb 902. Accordingly, improved ultra high pressure lamps are needed.

SUMMARY

A lamp—suitable for use within a projector or other high-light output application—includes an ultra high pressure bulb. An extension from the bulb defines a start-up bubble. A conductor is carried by the extension of the ultra high pressure bulb, generally enclosing the start-up bubble, thereby exciting gas contained within the start-up bubble. A header defines a socket within which the extension and the conductor are carried.

BRIEF DESCRIPTION OF THE DRAWINGS

The following detailed description refers to the accompanying figures. In the figures, the left-most digit(s) of a reference number identifies the figure (FIG.) in which the reference number first appears. Moreover, the same reference numbers are used throughout the drawings to reference like features and components.

DETAILED DESCRIPTION

Figure 1:
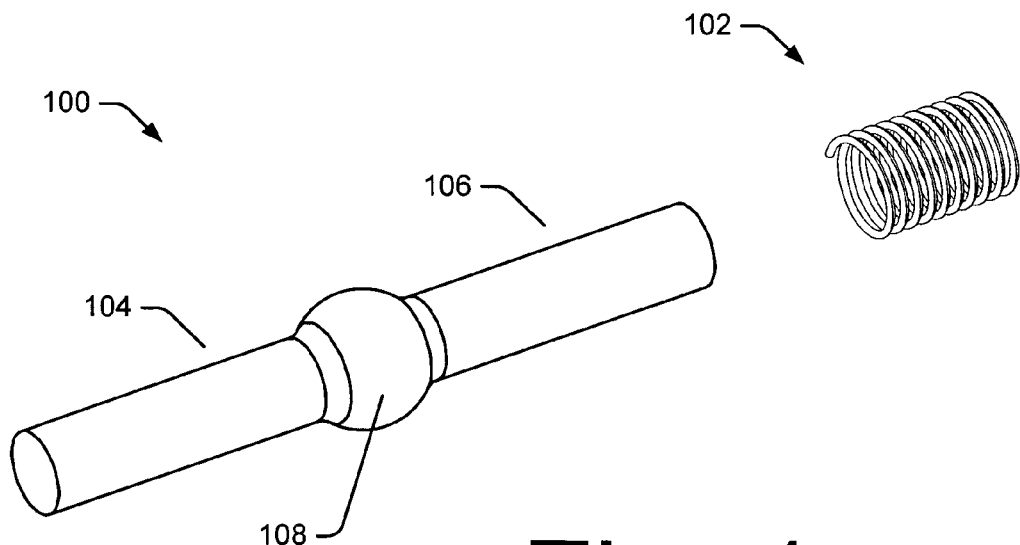
FIG. 1 is shows an exploded view of an exemplary ultra high pressure bulb and conductor.

FIG. 1 is shows an exploded view of an exemplary ultra high pressure bulb 100 and conductor 102. The exemplary ultra high pressure bulb 100 is typically made of quartz, which resists the temperatures and pressures at which the lamp operates, and which is a poor conductor of electricity. The exemplary bulb 100 includes two cylindrical extensions 104, 106 which (as will be seen in greater detail in FIG. 6)

each contain conductors in electrical communication with an electrode within a fireball portion 108 of the lamp.

The exemplary conductor 102 is illustrated in the form of a coil; however, the conductor 102 could alternatively be configured as a plate, a screen grid or other electrically conductive formation. However, the coil configuration shown is easily manufactured to fit the extension of the bulb 100. As will be seen in greater detail in FIG. 6, the operation of the conductor 102 allows the start-up voltage of the lamp to be reduced.

Figure 2:
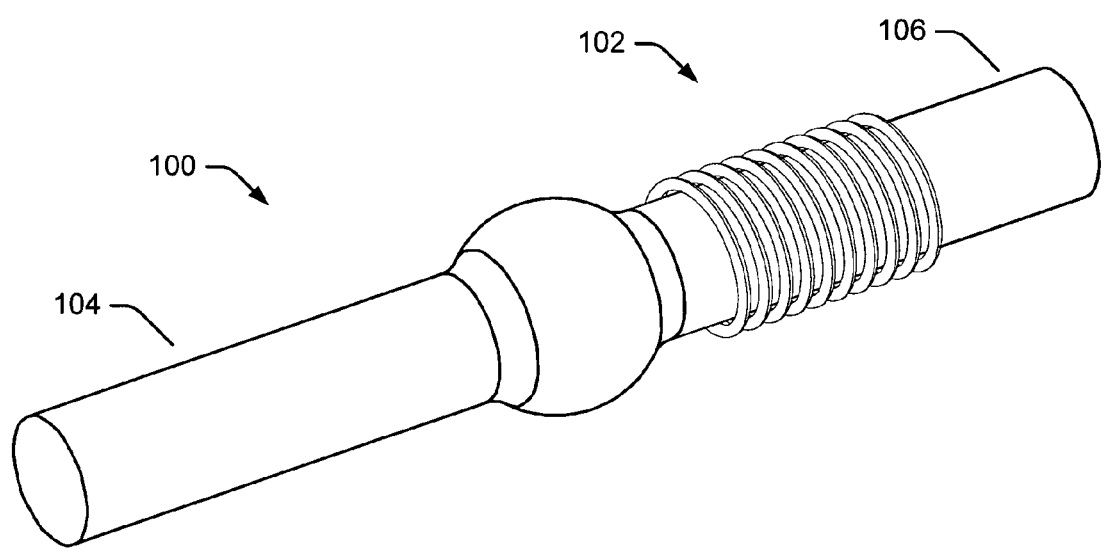
FIG. 2 is an assembled view of the exemplary ultra high pressure bulb and conductor of FIG. 1.

FIG. 2 is an assembled view of the exemplary ultra high pressure bulb 100 and conductor 102 of FIG. 1. Where the exemplary conductor 102 is configured as a coil, the conductor is easily installed on the extension 106 where the inside diameter of the coil is incrementally larger than the outside diameter of either extension. As seen in the example of FIG. 2, the conductor 102 is easily slid onto the extension 106 during assembly.

Figure 3:
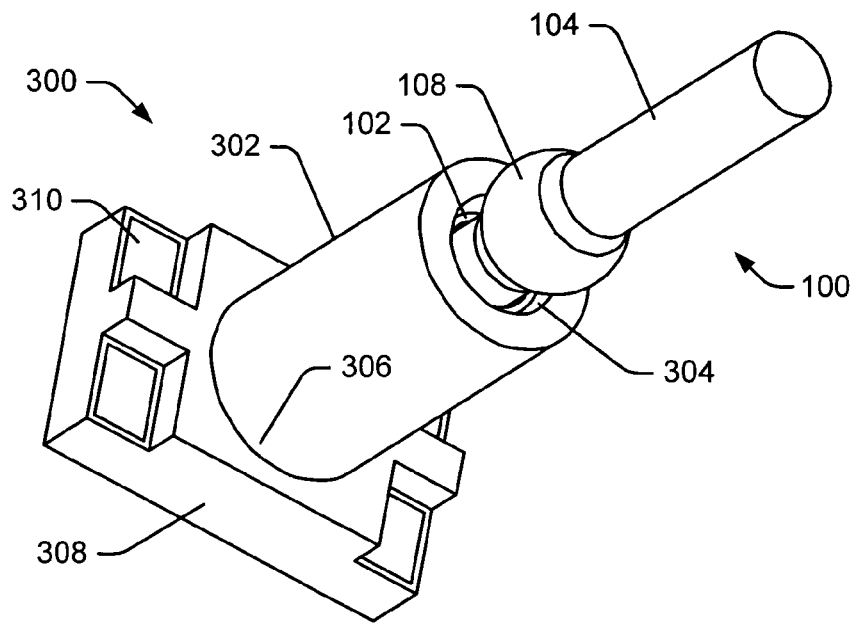
FIG. 3 is an isometric view of the ultra high pressure bulb and conductor of FIG. 2 assembled within an exemplary header.

FIG. 3 is an isometric view of the ultra high pressure bulb 100 and conductor 102 of FIG. 2 assembled within an exemplary header 300. The exemplary header 300 of FIG. 3 includes a generally cylindrical body 302 which defines an interior socket 304. A closed end 306 of the cylindrical body 302 is attached to a base 308. The exemplary base 308 includes at least two electrical contacts 310. In the assembled state, one extension 106 of the bulb 100 is wrapped with the coil 102 and inserted into the socket 304.

Figure 4:
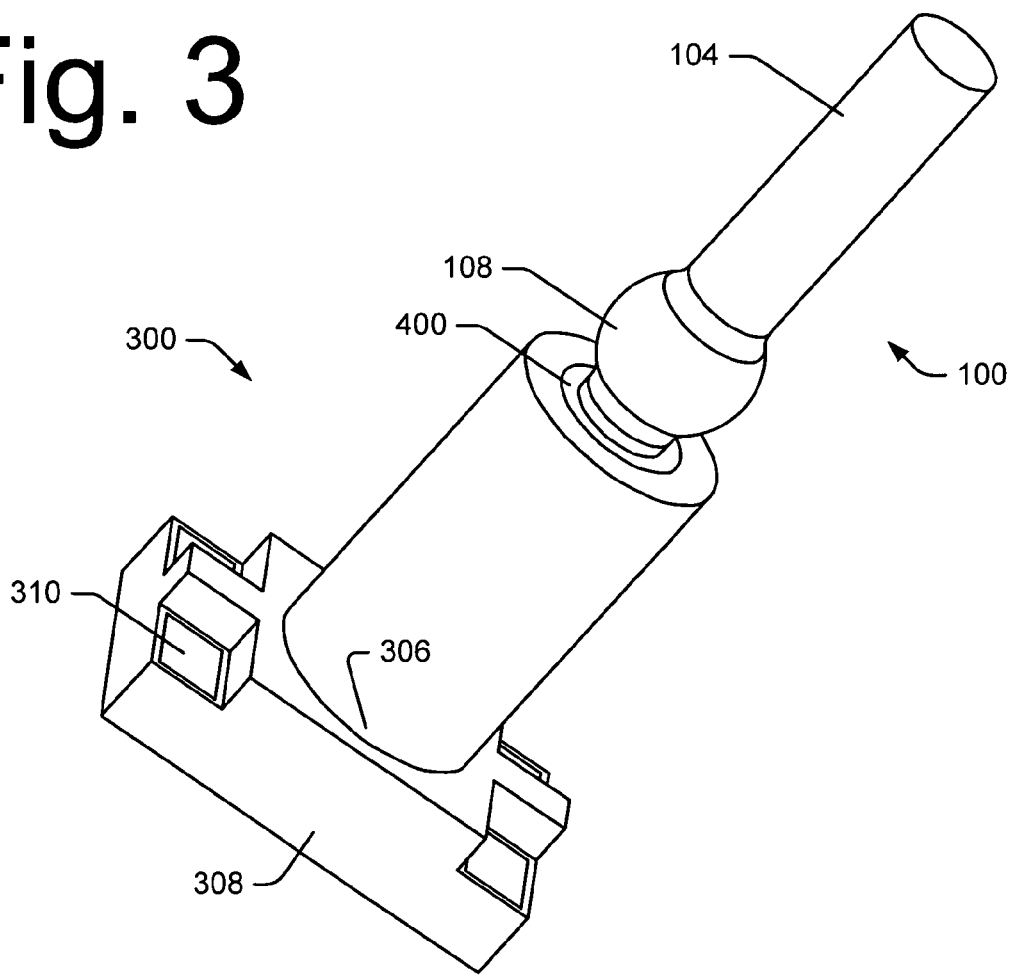
FIG. 4 is an isometric view similar to that of FIG. 3, additionally showing a layer of adhesive used to connect an extension of the ultra high pressure bulb, the conductor and the header.

FIG. 4 is an isometric view of the header 300 that is similar to that of FIG. 3, additionally showing a layer of adhesive 400. The layer of adhesive connects the extension 106 (better seen in FIG. 1) of the ultra high pressure bulb 100, the conductor 102 and the header 300.

Figure 5:
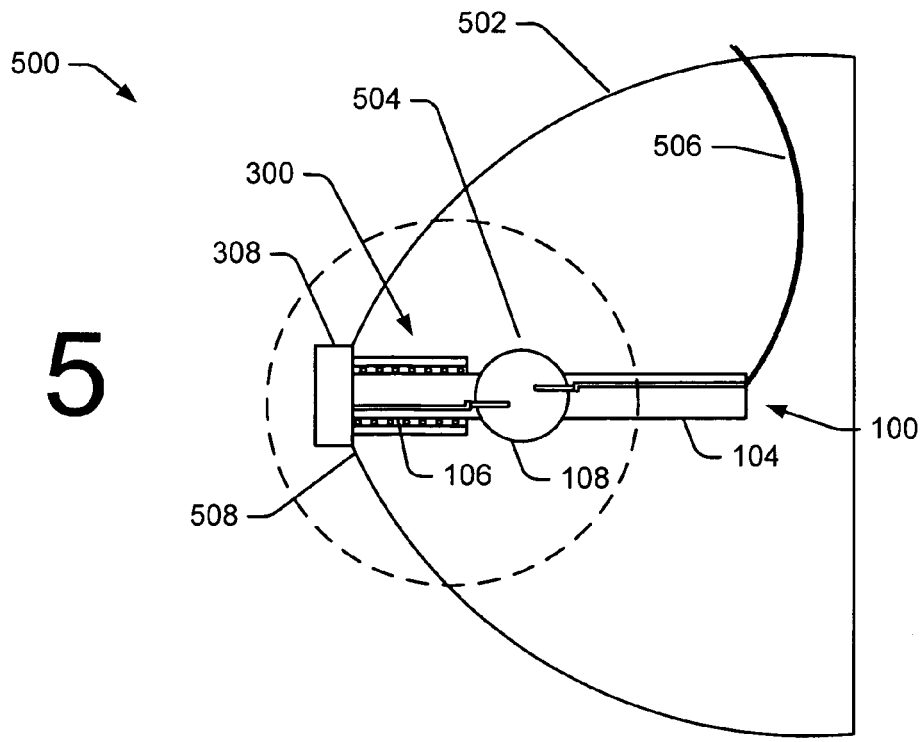
FIG. 5 is an exemplary cross-sectional view of a lamp assembly, wherein the header and bulb assembly of FIG. 4 is installed in a reflector.

FIG. 5 is an exemplary cross-sectional view of a lamp assembly 500, wherein the header and bulb assembly of FIG. 4 is installed in a reflector 502. The fireball 108 of the bulb is located generally at a focal point 504 of the reflector 502. Wiring 506 may be used to power an electrode within the fireball 108 by attaching to a conductor within the cylindrical extension 106 of the bulb 100. In the exemplary arrangement of FIG. 5, the base 308 of the header 300 is located generally at the center portion 508 of the reflector 502, causing the bulb 100, header 300 and reflector 502 to be co-axial.

Figure 6:
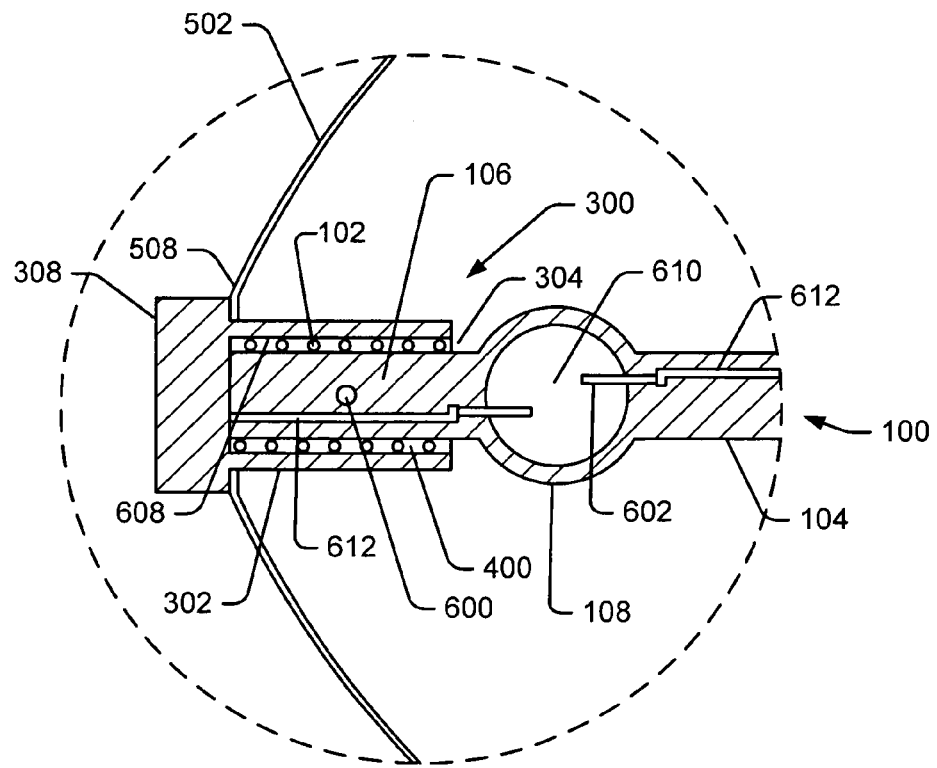
FIG. 6 is an enlarged view of portions of the exemplary lamp of FIG. 5.

FIG. 6 is an enlarged view of portions of the exemplary lamp of FIG. 5. The header 300 is located to position the header base 308 at a center portion 508 of the reflector 502. An inside surface 608 of the cylindrical body 302 of the header 300 forms a socket 304 that encloses the cylindrical extension 106 of the bulb 100, which is wrapped by the coil 102 and enclosed by the adhesive layer 400. A molybdenum conductor 612 is defined within each cylindrical extension 104, 106 to power electrodes 602 contained within the fireball cavity 610 of the fireball 108 of the bulb 100.

A start-up bubble 600 is defined within the extension 106 of the bulb 100, and is located within a space generally surrounded by the coil 102. The start-up bubble contains gas which is excited at start-up by the conductive coil 102. The excitement of the gas within the start-up bubble results in the release of UV light, which excites gas within the fireball chamber 610. Excitement of the gas within the fireball 108 lowers the voltage required at the electrodes 602, which tends to extend electrode life.

Figure 7:
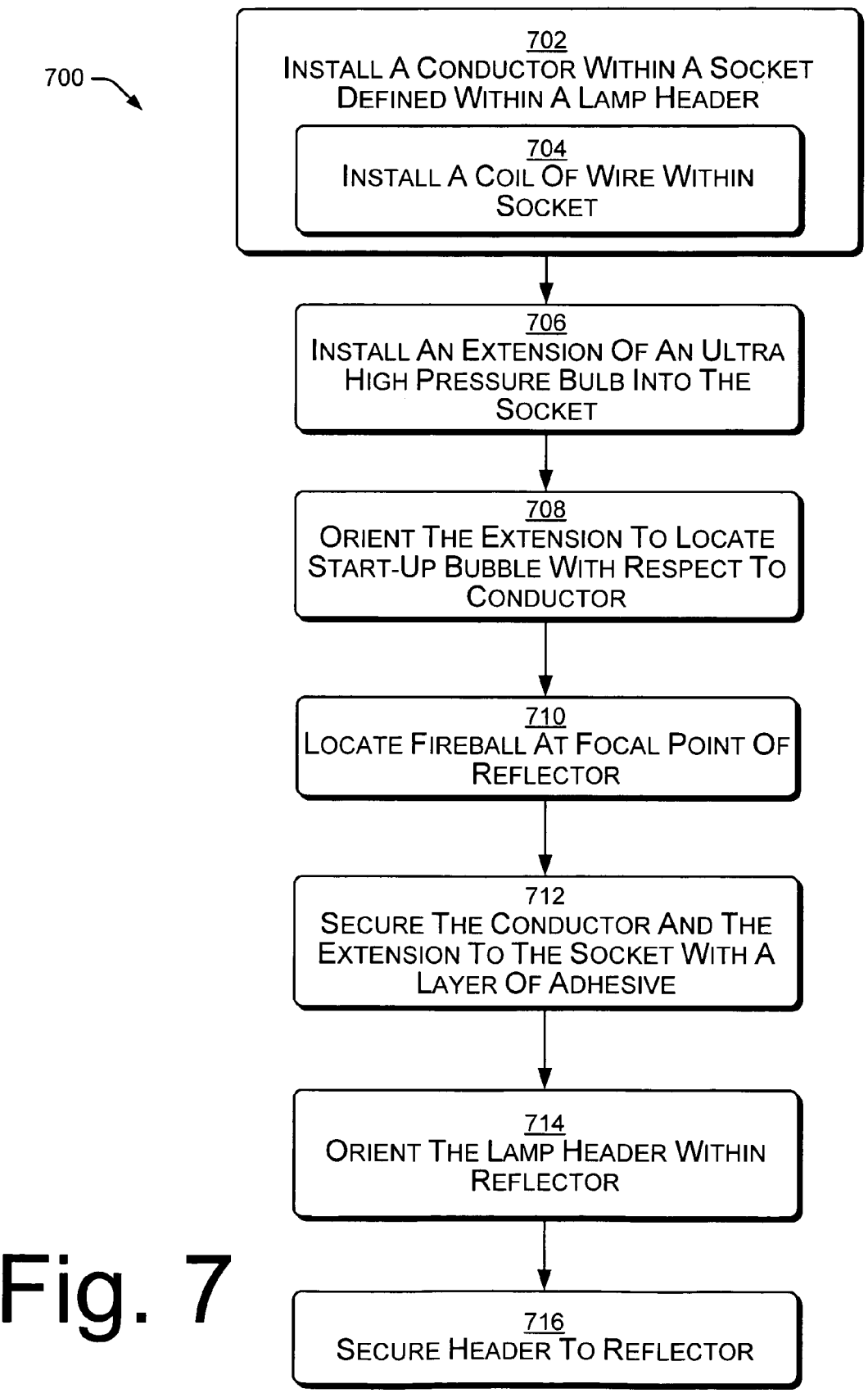
FIG. 7 is a flow diagram that describes an exemplary implementation, including a method employed for use in manufacturing an exemplary lamp assembly.

FIG. 7 is a flow diagram that describes an exemplary implementation 700, including a method employed for use in manufacturing an exemplary lamp assembly. At block 702, a conductor 102 is installed within a socket 304 defined within a lamp header 300. At block 704, in an exemplary arrangement, the conductor coil 102 of FIGS. 1 and 2 is used as the conductor. Note that while a coil is convenient, a wrapping of conductive foil or screen could be substituted.

At block 706, the extension of an ultra high pressure bulb is installed into the socket 304 defined in the header 300.

At block 708, the extension 104 is oriented to locate the start-up bubble 600 within an area substantially enclosed by the conductor 102. By orienting the start-up bubble with respect to the conductor 102, the conductor will be able to excite the gas within the start-up bubble.

At block 710, the fireball 108 is located at the focal point 504 of the reflector 502. The fireball 108 may be located at the focal point of the reflector by appropriate selection of a header 300 and a lamp 100, wherein the combined length of the selected header and lamp locate the fireball 108 at the focal point. Alternatively, the size of the reflector 502 selected can be altered, such that the fireball 108 is located at the focal point 504.

At block 712, the conductor and the extension are secured to the socket with a layer of adhesive.

In some applications, blocks 702-712 may be performed simultaneously, thereby installing the coil, lamp extension and adhesive into the socket of the header at the same time.

At block 714, the lamp header 300 is positioned within the reflector 502. Note that, in contrast to conventional configurations, because the conductor 102 is located within the socket 304 of the header 300, the conductor does not block light emitted from the fireball 108.

At block 716, the header 300 is secured to the reflector 502. The lamp assembly is now operational.

Figure 8:
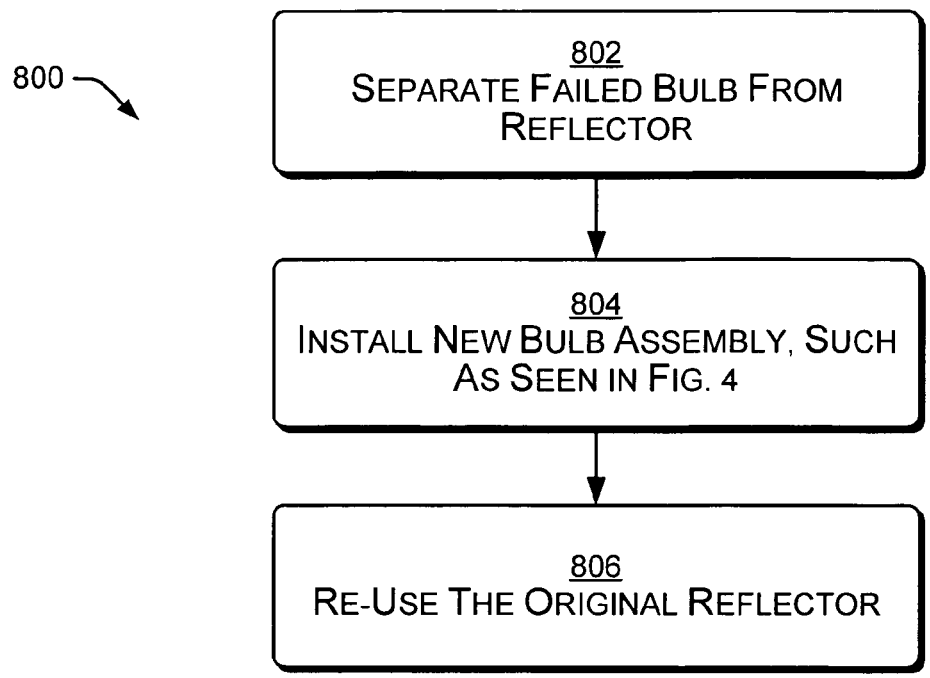
FIG. 8 is a flow diagram that describes an exemplary implementation, including a method employed for use in changing a failed lamp.
Figure 9:
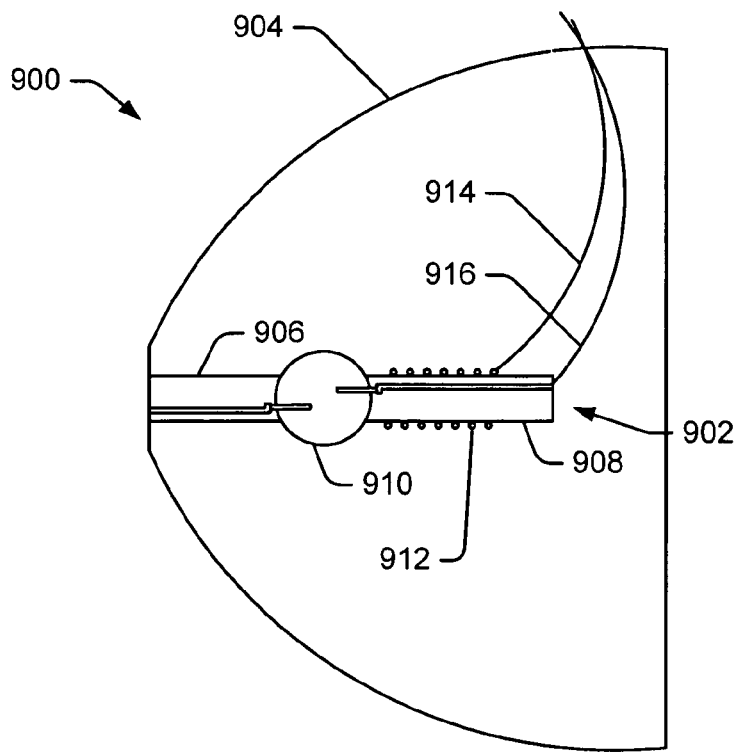
FIG. 9, Prior Art, illustrates a typical prior art high-pressure bulb, showing how the coil is in an exposed location, and showing how the coil and wiring leading to the coil tend to block light emitted from the bulb.

FIG. 8 is a flow diagram that describes an exemplary implementation 800, including a method employed for use in changing a failed lamp 100. At block 802, the failed bulb assembly, such as that seen in FIG. 4, is separated from the reflector 502. At block 804, a new bulb assembly is attached to the reflector 502. At block 806, the reflector is re-used.

Although the above disclosure has been described in language specific to structural features and/or methodological steps, it is to be understood that the appended claims are not limited to the specific features or steps described. Rather, the specific features and steps are exemplary forms of implementing this disclosure. For example, while actions described in blocks of the flow diagrams may be performed in parallel with actions described in other blocks, the actions may occur in an alternate order, or may be distributed in a manner which associates actions with more than one other block.

The invention claimed is:

1. A lamp, comprising:
    an ultra high pressure bulb having an extension defining a start-up bubble;
    a conductor, carried by the extension of the ultra high pressure bulb and generally enclosing the start-up bubble, wherein the conductor is configured to excite gas within the start-up bubble; and
    a header defining a socket within which the extension and the conductor are carried, wherein the header comprises:
    a cylindrical body within which the socket is defined; and
    a base carried by a closed end of the cylindrical body.

2. The lamp of claim 1, additionally comprising:
    an adhesive layer surrounding and electrically insulating the conductor and adhering the extension to an inside surface of the socket defined by the header.

3. The lamp of claim 1 wherein the conductor comprises:
    a coil, wrapped about the extension of the ultra high pressure bulb.

4. The lamp of claim 1, additionally comprising:
wherein the gas within the start-up bubble emits UV light due to stimulation from the conductor, and wherein the UV light lowers voltages required to turn on the lamp.

5. The lamp of claim 1, additionally comprising:
a reflector having a center portion with which the header co-axial.

6. The lamp of claim 5, wherein the header is located between the center of the reflector and a fire-ball portion of the ultra high pressure bulb.

7. A lamp assembly, comprising:
an ultra high pressure bulb; and
a header assembly, comprising:
  a tube defining a socket sized to accept an extension of the ultra high pressure bulb;
  a conductor configured against an inside surface of the socket;
  an adhesive layer to surround and electrically insulate the conductor; and
  a base, carried by a closed end of the tube, wherein the base portion includes at least two electrical contacts;
  wherein the header assembly is configured for releasable attachment to a reflector.

8. The lamp assembly of claim 7, wherein the tube and the base of the header assembly are sized to allow the tube to pass through a hole defined in a center of the reflector, while the base seats against a rim of the hole in a position outside the reflector, thereby allowing convenient separation of the lamp assembly and reflector.

9. The lamp assembly of claim 8, additionally comprising:
a start-up bubble, defined within the extension of the ultra high pressure bulb and located within the socket of the tube.

10. The lamp assembly of claim 9, additionally comprising:
wherein the start-up bubble contains gas which is excited by the conductor; and
wherein the excited gas emits UV light which lowers start-up voltages of the lamp.

11. The lamp assembly of claim 7 wherein the conductor comprises:
a coil, wrapped about a cylindrical extension of the lamp.

12. A method of manufacturing an ultra high pressure bulb assembly, comprising:
installing a conductor within a socket defined within a lamp header;
installing an extension of the ultra high pressure bulb into the socket,
  wherein a start up bubble, defined in the extension, is located within a region defined by the conductor; and
securing the conductor and the extension to the socket with a layer of adhesive, wherein the layer of adhesive and the extension are substantially electrically non-conductive;
wherein the socket portion of the lamp header is sized for insertion into an opening defined in a center of a reflector, and a base portion of the lamp header, which closes one end of the socket defined in the lamp header, is too large to pass through the opening and seats against the opening outside the reflector, wherein the lamp header is attached in a releasable manner to a reflector and provides at least two electrical contacts.

13. The method of claim 12, additionally comprising:
orienting the extension of the ultra high pressure bulb to locate a start-up bubble, defined within the extension, to a position within a region partially enclosed by the conductor.

14. The method of claim 12, additionally comprising:
orienting the lamp header within a reflector such that the conductor is located between a fire-ball portion of the ultra high pressure bulb and a center of the reflector.

15. The method of claim 12, additionally comprising:
locating a fire-ball portion of the ultra high pressure bulb at a focal point of a reflector by adjusting a combined length of the lamp header and the extension of the ultra high pressure bulb.

16. The method of claim 12, additionally comprising:
securing the lamp header to a reflector.

17. The method of claim 12, wherein installing a conductor comprises:
coiling a wire with turns having an outside diameter incrementally less than an inside diameter of the socket, wherein the wire wraps about the extension of the ultra high pressure bulb.

18. A method of changing a failed ultra high pressure bulb assembly, comprising:
separating the failed ultra high pressure bulb assembly from a reflector;
installing a new ultra high pressure bulb assembly, wherein the new ultra high pressure bulb assembly comprises:
  an ultra high pressure bulb defining a start-up bubble to emit UV light to reduce a start-up voltage required by the new ultra high pressure bulb;
  a conductor, carried by an extension of the ultra high pressure bulb, and secured in place by an insulating layer of adhesive; and
  a header assembly comprising a tube defining a socket sized to accept the extension, wherein the tube defines a cavity within which the extension and conductor are carried and wherein a base having at least two electrical contacts closes an end of the tube; and reusing the reflector.

19. An ultra high pressure bulb assembly, comprising:
a header assembly comprising a tube defining a socket sized to accept a portion of the ultra high pressure bulb, wherein the tube is sized to pass through a hole defined in a reflector, and a base having at least two electrical contacts and configured to close an end of the tube and sized to seat outside the reflector, against a rim of the hole;
an extension, extending from an ultra high pressure bulb, sized for insertion into the socket;
a conductor, carried against a sidewall defining the socket, for exciting gas within a start-up bubble defined within the extension and
adhesive for securing the conductor and the extension to the header.

20. The ultra high pressure bulb assembly of claim 19, wherein the conductor comprises a coil, wrapped about the extension.

21. The ultra high pressure bulb assembly of claim 19, wherein the header is located between a center of a reflector and a fire-ball portion of the ultra high pressure bulb.

* * * * *

UNITED STATES PATENT AND TRADEMARK OFFICE
CERTIFICATE OF CORRECTION

PATENT NO. : 7,276,852 B2 Page 1 of 1
APPLICATION NO. : 10/769324
DATED : October 2, 2007
INVENTOR(S) : John M. Koegler, III et al.

It is certified that error appears in the above-identified patent and that said Letters Patent is hereby corrected as shown below:

In column 4, line 21, delete "ln" and insert -- In --, therefor.

In column 6, line 54, in Claim 19, after "extension" insert -- ; --.

Signed and Sealed this

Twelfth Day of August, 2008

JON W. DUDAS
*Director of the United States Patent and Trademark Office*